United States Patent Office 3,161,637
Patented Dec. 15, 1964

3,161,637
1 - (GAMMA - AROYL - PROPYL) - 4 - (N - ARYL-CARBONYL AMINO) PIPERIDINES AND RELATED COMPOUNDS
Paul A. J. Janssen, Vosselaar, near Turnhout, Belgium, assignor to Research Laboratorium Dr. C. Janssen, N.V., Beerse, Belgium, a company of Belgium
No Drawing. Filed Oct. 10, 1961, Ser. No. 144,016
12 Claims. (Cl. 260—247.2)

The present invention relates to a novel group of compounds which are derivatives of 1 - aroylpropyl - 4 - arylaminopiperidines. More particularly it relates to compounds which can be represented by the following general formula

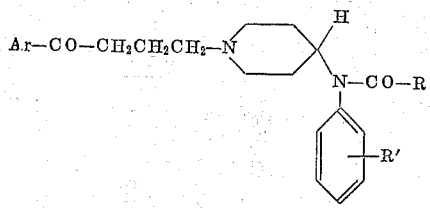

wherein Ar represents phenyl, halophenyl, tolyl, methoxyphenyl, or thienyl; R represents lower alkyl, cyclopropyl, phenyl, lower alkoxy, dimethylamino, morpholino, 1-piperidinyl, or 1-pyrrolidinyl; R' represents hydrogen, methyl, or methoxy. The halophenyl radicals referred to above are fluorophenyl, chlorophenyl, bromophenyl, and iodophenyl. The lower alkyl and lower alkoxy radicals referred to above contain fewer than 7 carbon atoms; examples of these radicals are methyl, ethyl, propyl, butyl, methoxy, ethoxy, and propoxy.

The organic bases of this invention form non-toxic, acid-addition salts with a variety of organic and inorganic acids. Such salts are formed with such acids as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds of this invention are useful because of their valuable pharmacological properties. In particular these compounds are neuroleptics and they are potent monoamino oxidase inhibitors which can be demonstrated by their inhibition of mono-amino oxidase activity in rat-liver homogenate tested with kynuramine as substrate. They also possess anti-apomorphine activity and show analgesic and mydriatic activity at higher doses.

The compounds of this invention can be advantageously prepared by the condensation of a compound of the formula

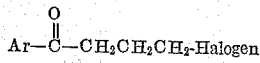

with an appropriately substituted piperidine of the formula

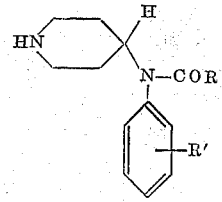

wherein Ar, R, and R' are defined as above. The condensation can be carried out in an inert solvent such as an aromatic hydrocarbon (e.g., benzene, toluene, xylene), a lower alkanol (e.g., ethanol, propanol, butanol), and a lower alkanone (e.g., acetone, butanone, pentanone, hexanone, and 4-methyl-2-pentanone). In certain cases the reaction can be usefully accelerated by the use of elevated temperatures.

To prepare the intermediate piperidines described above, 1-benzyl-4-piperidone is condensed with an aromatic amine to give a 1-benzyl - 4 - arylaminopiperidine which is then reduced to give the corresponding 1-benzyl-4-arylaminopiperidine. This 1-benzyl-4-arylaminopiperidine is then treated with an appropriate acid anyhdride or acid chloride to give the corresponding amide, with an alkyl chloroformate to give the corresponding urethane or first with phosgene and then with an appropriate amine to give the corresponding urea. The substituted 1-benzyl-piperidine is debenzylated by hydrogenation over palladium on charcoal to give the desired intermediate 4-substituted piperidine described above.

The compounds which constitute this invention and their preparation will appear more fully from a consideration of the following examples which are given for the purpose of illustration only and are not to be construed as limiting the invention in spirit or scope. In these examples quantities are indicated in parts by weight, temperatures are expressed in degrees centigrade (° C.), and pressures are expressed in millimeters of mercury (mm.).

Example 1

A mixture of 95 parts of 1-benzyl-4-piperidone, 60 parts of aniline, 800 parts of toluene and 0.05 part of 4-toluenesulfonic acid is refluxed in a vessel provided with a water separator. After 15 hours, the calculated amount of water has separated and the mixture is cooled. The toluene is evaporated and the residue is dissolved in 300 parts of diisopropyl ether with stirring. The solution is filtered and the solvent is evaporated from the filtrate. The residue is distilled to give N-(1-benzyl-4-piperidylidene)aniline, boiling at about 170° C. at 0.05 mm. pressure. This compound has the following formula

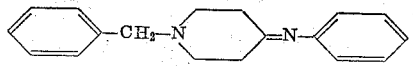

By following the above procedure and reacting the appropriate amine with 1-benzyl-4-piperidone, the following compounds are obtained:

N-(1-benzyl-4-piperidylidene)-2-toluidine, boiling at about 176–185° C. at 0.05 mm. pressure.

N-(1-benzyl-4-piperidylidene)-4-toluidine, boiling at about 180–190° C. at 0.5 mm. pressure with decomposition.

N-(1-benzyl-4-piperidylidene)-2-anisidine, boiling at about 204° C. at 1.5 mm. pressure.

N - (1-benzyl-4-piperidylidene)-4-anisidine boiling at about 200–210° C. at 0.2 mm. pressure.

Example 2

To a suspension of 8 parts of lithium aluminum hydride in 200 parts of ether is added portionwise a solution of 26 parts of N-(1-benzyl-4-piperidylidene)aniline in 200 parts of ether. The reaction mixture is stirred and refluxed for 5 hours, before it is cooled and decomposed by the addition of 200 parts of water. The mixture is acidified with 100 parts of 12 N hydrochloric acid to give a clear solution. The aqueous layer is separated and 64 parts of tartaric acid is added to this solution with stirring. The resultant solution is made strongly alkaline and extracted with 3 portions of benzene. The organic layer is dried over potassium carbonate and filtered, and the solvent is evaporated. The resultant residue is recrystallized from petroleum ether to give 1-benzyl-4-anilinopiperidine, melting at about 84.8–86° C. This compound has the following formula

If an equivalent quantity of the appropriate Schiff base is substituted for the N-(1-benzyl-4-piperidylidene)aniline and the above procedure is repeated, the following compounds are obtained:

1-benzyl-4-(2-toluidino)piperidine, melting at about 103–103.8° C.

1-benzyl-4-(4-toluidino)piperidine, melting at about 95.8–96.8° C.

1-benzyl-4-(2-anisidino)piperidine, melting at about 91–93° C.

1-benzyl-4-(4-anisidino)piperidine, melting at about 65–66° C. The dihydrochloride of this compound melts at about 252–265° C.

*Example 3*

To a solution of 19.5 parts of 1-benzyl-4-anilinopiperidine in 160 parts of benzene is added portionwise a solution of 10 parts of acetic anhydride and 40 parts of benzene with stirring. The mixture is refluxed for 3 hours before it is cooled and alkalized with sodium hydroxide solution. The organic layer is separated, washed with water, dried and filtered, and the solvent is evaporated from the filtrate. The residue is dissolved in petroleum ether and crystallizes on cooling to give N-(1-benzyl-4-piperidyl)acetanilide, melting at about 107–109.2° C. with decomposition. This compound has the following formula

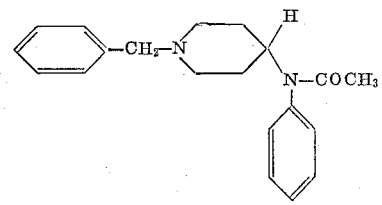

If the appropriate amine is substituted in the above procedure and heated with acetic anhydride, the following compounds are obtained:

N-(1-benzyl-4-piperidyl)-o-acetotoluidide, melting at about 78.5–79.2° C.

N-(1-benzyl-4-piperidyl)-p-acetotoluidide, melting at about 114–115° C.

N - (1-benzyl - 4 - piperidyl)-o-acetanisidide, melting at about 132–136° C.

*Example 4*

To a solution of 23 parts of 1-benzyl-4-(o-anisidino)piperidine in 160 parts of benzene is added portionwise a solution of 13 parts of propionic anhydride in 40 parts of benzene. The mixture is refluxed for 6 hours and then alkalized with 120 parts of 10% sodium hydroxide solution. The organic layer is separated, dried over potassium carbonate and filtered, and the solvent is evaporated. The residue is dissolved in diisopropyl ether and the product crystallizes from solution on standing at room temperature to give N-(1-benzyl-4-piperidyl)-o-propionanisidide, melting at about 70–73.4° C. with decomposition.

By substituting equivalent quantities of the appropriate amine in the above procedure, the following amides are obtained:

N-(1-benzyl - 4 - piperidyl)propionanilide, melting at about 74–76° C.

N-(1-benzyl-4-piperidyl)-o-propionotoluidide.

N-(1-benzyl-4-piperidyl)-p-propionotoluidide, melting at about 111–112° C.

N-(1-benzyl-4-piperidyl)-p-propionanisidide hydrochloride, melting at about 210–220° C. This salt is obtained by passing hydrogen chloride gas through a diisopropyl ether solution of the free amine.

*Example 5*

A mixture of 13 parts of 1-benzyl-4-anilinopiperidine, 12 parts of butyric anhydride, and 160 parts of benzene is stirred and refluxed for 16 hours. The reaction mixture is alkalized with 10% sodium hydroxide solution. The organic layer is separated, dried over magnesium sulfate and filtered, and the solvent is evaporated from the filtrate. The residue is dissolved in 320 parts of diisopropyl ether and hydrogen chloride gas is introduced into the solution. The precipitated hydrochloride is filtered, boiled in 120 parts of ethyl acetate, and filtered again to give N-(1-benzyl-4-piperidyl)butyranilide hydrochloride, melting at about 230–231° C.

If equivalent quantities of the appropriate amine are substituted for the 1-benzyl-4-anilinopiperidine and the above procedure is repeated, the following compounds are obtained:

N - (1 - benzyl - 4 - piperidyl) - o - butyrotoluidide hydrochloride, melting at about 174–175° C.

N - (1 - benzyl - 4 - piperidyl) - p - butyrotoluidide hydrochloride, melting at about 236–238° C.

*Example 6*

To a solution of 16.8 parts of 1-benzyl-4-(2-toluidino)piperidine in 80 parts of anhydrous toluene is added portionwise a solution of 7.8 parts of cyclopropanecarbonyl chloride in 24 parts of anhydrous toluene. After the addition is complete, the solution is stirred for 30 minutes at room temperature and refluxed for 4 hours. 100 parts of water is added to the cooled mixture. The organic layer is separated and extracted with water, and the combined aqueous layers are alkalized with sodium hydroxide solution and extracted with benzene. The benzene solution is dried over magnesium sulfate and the solvent is evaporated to leave an oily residue which is stirred in diisopropyl ether and cooled to 0° C. to give N - (1 - benzyl - 4 - piperidyl) - N - (o - tolyl)cyclopropanecarboxamide, melting at about 123–124° C.

If the above procedure is repeated and valeryl chloride is substituted for the cyclopropanecarbonyl chloride, the product is N-(1-benzyl-4-piperidyl)-o-valerotoluidide. In this case, hydrogen chloride gas is introduced into a diisopropyl ether solution of the free amine to give the corresponding hydrochloride, which melts at about 164–167° C.

*Example 7*

A solution of 15.6 parts of cyclopropanecarbonyl chloride in 60 parts of toluene is added portionwise to a solution of 30 parts of 1-benzyl-4-anilinopiperidine in 120 parts of toluene. When the addition is complete, the mixture is stirred for 30 minutes at room temperature, and then refluxed for 4 hours. 200 parts of water is added to the cooled mixture and it is heated to reflux and cooled to room temperature to give N-(1-benzyl-4-piperidyl) - N - phenylcyclopropanecarboxamide hydrochloride, melting at about 255–258° C.

*Example 8*

To a solution of 20 parts of 1-benzyl-4-anilinopiperidine in 160 parts of 10% sodium hydroxide solution and 120 parts of benzene there is added portionwise a solution of 14 parts of benzoyl chloride in 40 parts of benzene with stirring. The mixture is stirred for one hour at 80° C. and then cooled. The organic layer is separated, washed with water, dried over potassium carbonate and filtered, and the solvent is evaporated. The residue is dissolved in petroleum ether and cooled to give N-(1-benzyl-4-piperidyl)benzanilide, melting at about 108–111° C.

*Example 9*

31 parts of 1-benzyl-4-anilinopiperidine is stirred in 120 parts of pyridine at room temperature. To this solution is added a solution of 18 parts of ethyl chloroformate in 32 parts of ether. After the addition is complete, the mixture is stirred at room temperature for 16 hours, and then on the water bath at 60–65° C. The mixture is cooled. The solid is filtered off and washed with acetone and then recrystallized from water to give ethyl N-(1-benzyl-4-piperidyl)-N-phenylcarbamate hydrochloride, melting at about 231–233° C. This compound has the following formula

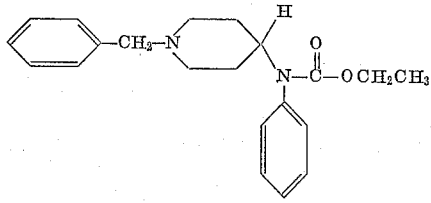

If an equivalent quantity of methyl chloroformate is substituted for the ethyl chloroformate and the above procedure is repeated, the product is methyl N-(1-benzyl-4-piperidyl)-N-phenylcarbamate hydrochloride.

*Example 10*

To a solution of 15 parts of phosgene in 56 parts of toluene is added portionwise a solution of 13.3 parts of 1-benzyl-4-anilinopiperidine in 24 parts of toluene. The resultant mixture is stirred at room temperature for 20 minutes and then heated on a water bath for 2 hours. A solid precipitates from the cooled mixture, and it is filtered off and washed with diisopropyl ether and dried to give N-(1-benzyl-4-piperidyl)-N-phenylcarbamyl chloride hydrochloride, melting at about 178–185° C. This compound has the following formula

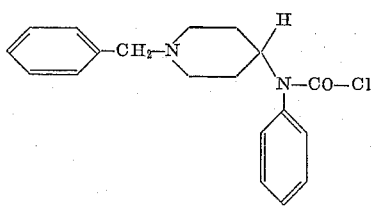

If an equivalent quantity of 1-benzyl-4-(2-toluidino)piperidine is substituted for the 1-benzyl-4-anilinopiperidine and the above procedure is repeated, the product is N-(1-benzyl-4-piperidyl)-N-(o-tolyl)carbamyl chloride hydrochloride melting at about 195–198° C.

*Example 11*

To a stirred mixture of 60 parts of piperidine in 120 parts of benzene is added portionwise 25 parts of N-(1-benzyl-4-piperidyl)-N-phenylcarbamyl chloride hydrochloride. The mixture is refluxed for 3 hours and then cooled, and 200 parts of water is added. The organic layer is separated, washed 3 times with 200 parts of water, dried over potassium carbonate and filtered, and the solvent is evaporated. The residue is recrystallized from petroleum ether to give N-(1-benzyl-4-piperidyl)-N-phenyl-N',N'-pentamethyleneurea, melting at about 115–116° C. This compound has the following formula

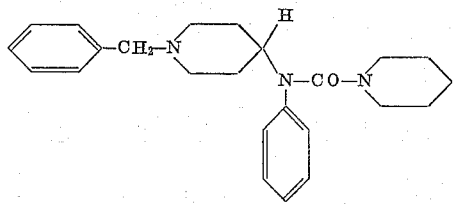

If equivalent quantities of the appropriate amine are substituted for piperidine and the above procedure is repeated, the following compounds are obtained:

N - (1-benzyl-4-piperidyl)-N-phenyl-N',N'-tetramethyleneurea, melting at about 92–95.5° C.

N - (1 - benzyl-4-piperidyl)-N-phenyl-N',N'-dimethylurea, melting at about 99.8–101° C.

N - (1 - benzyl-4-piperidyl)-N-phenyl-N',N'-(3-oxapentamethylene)urea, melting at about 104–106° C.

N - (1 - benzyl-4-piperidyl)-N-(o-tolyl)-N',N'-pentamethyleneurea. In this case, N-(1-benzyl-4-piperidyl)-N-(o-tolyl)carbamyl chloride hydrochloride is reacted with piperidine.

*Example 12*

A solution of 21.5 parts of N-(benzyl-4-piperidyl)-o-acetotoluidide in 200 parts of ethanol is hydrogenated at atmospheric pressure and room temperature in the presence of 5 parts of 10% palladium-on-charcoal catalyst. Hydrogenation is stopped after the calculated amount of hydrogen is taken up. The catalyst is filtered off and the solvent is evaporated. The residue is recrystallized from ether to give N-(4-piperidyl)-o-acetotoluidide, melting at about 113.5–114.5° C. This compound has the following formula

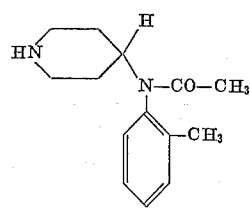

If equivalent quantities of the appropriate piperidyl amide are substituted for the N-(1-benzyl-4-piperidyl)-o-acetotoluidide and the above procedure is repeated, the following compounds are obtained:

N - (4 - piperidyl)acetanilide, melting at about 129–130° C.

N-(4-piperidyl)propionanilide, melting at about 83–85° C.

N-(4-piperidyl)butyranilide, melting at about 93.4–95.8° C.

N-(4-piperidyl)benzanilide hydrochloride, melting at about 207–210° C.

N - (4 - piperidyl)-N-phenylcyclopropanecarboxamide hydrochloride, melting at about 238–239° C.

N - (4-piperidyl)-N-(o-tolyl)cyclopropanecarboxamide melting at about 83–88° C.

N-(4-piperidyl)-p-acetotoluidide, melting at about 119–121° C.

N-(4-piperidyl)-o-propionotoluidide.

N - (4 - piperidyl)-p-propionotoluidide hydrochloride, melting at about 176–177° C.

N-(4-piperidyl)-o-butyrotoluidide.

N-(4-piperidyl)-p-butyrotoluidide hydrochloride, melting at about 196–197.5° C.

N-(4-piperidyl)-o-valerotoluidide hydrochloride, melting at about 129–130.5° C.

N-(4-piperidyl)-o-acetanisidide, melting at about 141–144.5° C.

N-(4-piperidyl)-o-propionaniside.

N-(4-piperidyl)-p-propionanisidide.

Methyl N-(4-piperidyl)-N-phenylcarbamate hydrochloride.

Ethyl N-(4-piperidyl)-N-phenylcarbamate hydrochloride, melting at about 225–227° C. with decomposition.

N - (4 - piperidyl)-N-phenyl-N',N'-tetramethyleneurea, melting at about 110.6–113° C. The hydrochloride of this compounds melts at about 266–267° C.

N - (4 - piperidyl)-N-phenyl-N',N'-pentamethyleneurea, melting at about 101–103° C.

N - (4 - piperidyl)-N-phenyl-N',N'-(3-oxapentamethylene)urea hydrochloride, melting at about 254–256.5° C.

N - (4 - piperidyl)-N-phenyl-N',N'-dimethylurea hydrochloride, melting at about 242–246° C.

N - (4 - piperidyl)-N-(o-tolyl)-N',N'-pentamethyleneurea.

Example 13

A solution of 6 parts of γ-chloro-4-fluorobutyrophenone in 120 parts of 4-methyl-2-pentanone is added portionwise to a stirred mixture of 5 parts of N-(4-piperidyl)acetanilide, 7 parts of sodium carbonate and 0.1 part of potassium iodide in 80 parts of 4-methyl-2-pentanone. When the addition is complete, the mixture is stirred and refluxed for 36 hours. It is filtered while hot and the solvent is evaporated from the filtrate. The residue is recrystallized from diisopropyl ether to give N - {1 - [γ - (4 - fluorobenzoyl)propyl] - 4 - piperidyl} acetanilide melting at about 102–104° C. This compound has the following formula

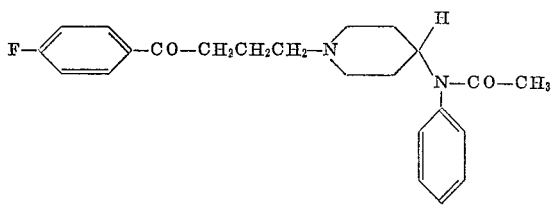

Example 14

To a stirred mixture of 5 parts of γ-chloro-4-fluorobutyrophenone, 7 parts of sodium carbonate and 0.1 part of potassium iodide in 80 parts of 4-methyl-2-pentanone is added portionwise a solution of 4.6 parts of N-(4-piperidyl)propionanilide in 120 parts of 4-methyl-2-pentanone. The mixture is stirred and refluxed for 36 hours after the addition is complete. The hot mixture is filtered and the solvent is evaporated from the filtrate to leave a residue which is recrystallized from diisopropyl ether to give N - {1 - [γ - (4 - fluorobenzoyl)propyl]-4-piperidyl}propionanilide melting at about 79.6–81° C.

Example 15

A mixture of 6 parts of γ-chloro-4-fluorobutyrophenone, 6 parts of N-(4-piperidyl)butyranilide, 7.6 parts of sodium carbonate and 0.1 part of potassium iodide in 160 parts of 4-methyl-2-pentanone is stirred and refluxed for 48 hours; 100 parts of water is added to the cooled reaction mixture. The aqueous layer is separated and extracted once with 80 parts of toluene. The combined organic layers are then dried over magnesium sulfate and the solvent is evaporated. The residue is recrystallized from diisopropyl ether to give N-{1-[γ-(4-fluorobenzoyl)propyl]-4-piperidyl}butyranilide melting at about 95–95.6° C.

Example 16

A mixture of 4 parts of γ-chloro-4-fluorobutyrophenone, 5 parts of N-(4-piperidyl)-N-phenylcylopropanecarboxamide hydrochloride, 5.7 parts of sodium carbonate, and 0.1 part of potassium iodide in 176 parts of 4-methyl 2-pentanone is stirred and refluxed for 42 hours. The cooled reaction mixture is filtered and the solvent is evaporated from the filtrate to leave an oily residue which is dissolved in 40 parts of diisopropyl ether. N - {1 - [γ - (4 - fluorobenzoyl)propyl] - 4 - piperidyl} - N - phenylcylopropanecarboxamide crystallizes from the solution. This product melts at about 109–110° C.

Example 17

Six parts of γ-chloro-4-fluorobutyrophenone, 5 parts of N-(4-piperidyl)-o-acetotoluidide, 9.5 parts of sodium carbonate, and 0.1 part of potassium iodide in 200 parts of 4-methyl-2-pentanone is stirred and refluxed for 40 hours. The reaction mixture is filtered while hot and the solvent is evaporated from the filtrate. Crystallization of the residue from diisopropyl ether gives N-{1-[γ - (4 - fluorobenzoyl) - propyl] - 4 - piperidyl} - o - acetotoluidide melting at about 117.5–119° C. This compound has the following formula

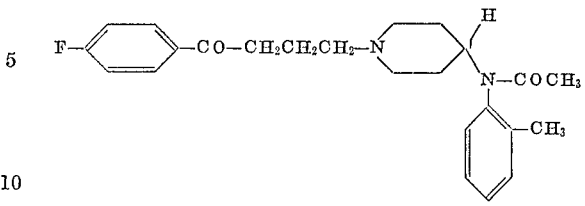

Example 18

To a stirred mixture of 5.1 parts of N-(4-piperidyl)-p-acetotoluidide, 7 parts of sodium carbonate and 0.1 part of potassium iodide in 120 parts of 4-methyl-2-pentanone is added portionwise a solution of 5.5 parts of γ-chloro-4-fluorobutyroprophenone in 24 parts of 4-methyl-2-pentanone. The resultant mixture is stirred and refluxed for 40 hours and then filtered hot. The solvent is evaporated from the filtrate to leave an oily residue which crystallizes from a solution in 160 parts of diisopropyl ether to give N-{1-[γ-(4-fluorobenzoyl)-propyl]-4-piperidyl}-p-acetotoluidide melting at about 106.5–107.5° C.

Example 19

A mixture of 8 parts of γ-chloro-4-fluorobutyrophenone, 7.5 parts of N-(4-piperidyl)-o-propionotoluidide, 13 parts of sodium carbonate and 0.1 part of potassium iodide in 200 parts of 4-methyl-2-pentanone is stirred and refluxed for 40 hours. The hot reaction mixture is filtered and the solvent is evaporated from the filtrate to leave a residue which is dissolved in 200 parts of diisopropyl ether and filtered. The filtrate is concentrated to 70 parts and cooled to give N - {1 - [γ - (4 - fluorobenzoyl) - propyl] - 4 - piperidyl}-o-propionotoluidide melting at about 79.5–81.5° C.

Example 20

To a stirred mixture of 5.4 parts of N-(4-piperidyl)-p-propionotoluidide which has been isolated from its hydrochloride, 6.6 parts of sodium carbonate, and 0.1 part of potassium iodide in 120 parts of 4-methyl-2-pentanone is added portionwise a solution of 5.5 parts of γ-chloro-4-fluorobutyrophenone and the resultant mixture is stirred and refluxed for 40 hours. The hot mixture is filtered and the solvent is evaporated from the filtrate to leave an oily residue which is dissolved in 160 parts of diisopropyl ether. The ether solution is filtered, concentrated to a volume of about 70 parts and cooled. N-{1-[γ-(4-fluorobenzoyl)propyl]-4-piperidyl}-p - propionotoluidide melting at about 80–84° C., crystallizes from the solution.

Example 21

After a mixture of 8 parts of γ-chloro-4-fluorophenone, 8 parts of N-(4-piperidyl)-o-butyrotoluidide, 0.1 part of potassium iodide and 12 parts of sodium carbonate in 200 parts of 4-methyl-2-pentanone is stirred and refluxed for 36 hours, it is filtered hot. The solvent is evaporated from the filtrate, the residue is dissolved in 220 parts of diisopropyl ether and hydrogen chloride gas is introduced into the solution. The precipitated hydrochloride is filtered off and recrystallized from acetone to give N-{1-[γ-(4-fluorobenzoyl)propyl] - 4 - piperidyl} - o - butyrotoluidide hydrochloride melting at about 175–177° C. N-{1-[γ-(4-fluorobenzoyl)propyl-4-piperidyl} - o - butyrotoluidide oxalate melts at about 126.5–128° C.

Example 22

To a stirred mixture of 5.4 parts of N-(4-piperidyl)-p-butyrotoluidide isolated from its hydrochloride, 6.5 parts of sodium carbonate and 0.1 part of potassium iodide in 120 parts of 4-methyl-2-pentanone is added portionwise a solution of 5.1 parts of γ-chloro-4-fluorobutyrophenone in 24 parts of 4-methyl-2-pentanone and the resultant mixture is stirred and refluxed for 40 hours. The hot mixture is filtered and the solvent is evaporated from the filtrate to leave an oily residue which is dissolved in 160 parts of diisopropyl ether. The ether solution is filtered. The filtrate is concentrated to 70 parts and then cooled at 0° C. N-{1-[γ-(4-fluorobenzoyl)propyl]-4-piperidyl}-p-butyrotoluidide, melting at about 87–87.8° C., crystallizes from the solution. This product has the following formula

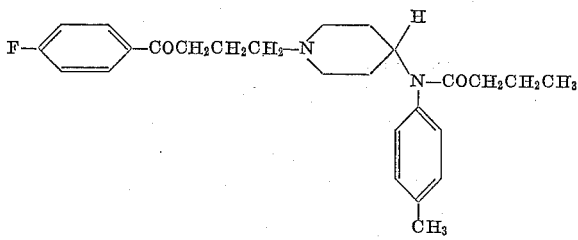

Example 23

A mixture of 4 parts of γ-chloro-4-fluorobutyrophenone, 5 parts of N-(4-piperidyl)-o-valerotoluidide hydrochloride, 6.8 parts of sodium carbonate and 0.1 part of potassium iodide in 200 parts of 4-methyl-2-pentanone is stirred and refluxed for 50 hours. The cooled reaction mixture is filtered and the solvent is evaporated from the filtrate to leave a residue which is dissolved in 200 parts of diisopropyl ether. Hydrogen chloride gas is introduced into the solution and a sticky hydrochloride precipitates. The ether is decanted and the residue is dissolved in water. The aqueous solution is alkalized and extracted with 3 portions of benzene. The solvent is evaporated from the dried benzene solution and the residue is dissolved in 40 parts of petroleum ether. N-{1-[γ-(4-fluorobenzoyl)propyl]-4-piperidyl}-o-valerotoluidide melting at about 69–71° C. crystallizes from the solution.

If an equivalent quantity of N-(4-piperidyl)-o-propionanisidide is substituted for the N-(4-piperidyl)-o-valerotoluidide hydrochloride and the above procedure is repeated, the product is N-{1-[γ-(4-fluorobenzoyl)propyl]-4-piperidyl}-o-propionanisidide melting at about 87–88.5° C. after crystallization from diisopropyl ether.

If an equivalent quantity of N-(4-piperidyl)-p-propionanisidide is substituted for the N-(4-piperidyl)-o-valerotoluidide hydrochloride and the above procedure is repeated, the product is N-{1-[γ-(4-fluorobenzoyl)propyl]-4-piperidyl}-p-propionanisidide.

Example 24

A mixture of 4 parts of γ-chloro-4-fluorobutyrophenone, 3.5 parts of N-(4-piperidyl)-o-acetanisidide, 8 parts of sodium carbonate and 0.1 part of potassium iodide in 160 parts of 4-methyl-2-pentanone is stirred and refluxed for 56 hours. The hot mixture is filtered and the solvent is evaporated from the filtrate to leave a residue which is dissolved in 16 parts of diisopropyl ether. N-{1-[γ-(4-fluorobenzoyl)propyl] - 4 - piperidyl}-o-acetanisidide, melting at about 120.4–122° C., crystallizes from the solution on standing.

Example 25

To a stirred mixture of 5 parts of N-(4-piperidyl)-propionanilide, 6.85 parts of sodium carbonate and 0.1 part of potassium iodide in 120 parts of 4-methyl-2-pentanone is added portionwise a solution of 4.9 parts of γ-chlorobutyrophenone in 24 parts of 4 - methyl - 2 - pentanone. The resultant mixture is stirred and refluxed for 30 hours and then filtered while it is still hot. The solvent is evaporated from the filtrate and the oily residue is dissolved in 160 parts of diisopropyl ether. The ether solution is filtered, concentrated to 70 parts and cooled. N-[1-(benzoylpropyl) - 4 - piperidyl]propionanilide, melting at about 73–74° C., crystallizes from the solution.

If an equivalent quantity of 2-(γ-chlorobutyryl)- thiophene is substituted for the γ-chlorobutyrophenone and the above procedure is repeated, the product is N-{1-[γ-(2-thenoyl)propyl]-4-piperidyl}propionanilide melting at about 100–101.5° C.

Example 26

To a stirred mixture of 5.16 parts of N-(4-piperidyl)-N-(o-tolyl)cyclopropanecarboxamide, 6.5 parts of sodium carbamate and 0.1 part of potassium iodide in 136 parts of 4-methyl-2-pentanone is added portionwise a solution of 5 parts of γ-chloro-4-fluorobutyrophenone in 24 parts of 4-methyl-2-pentanone. When the addition is complete, the resultant mixture is stirred and refluxed for 48 hours. 100 parts of water is added to the cooled reaction mixture. The organic layer is separated and the aqueous layer is extracted once with 4-methyl-2-pentanone. The combined organic layers are dried and the solvent is evaporated. The residue is dissolved in 280 parts of diisopropyl ether and filtered and hydrogen chloride gas is introduced into the filtrate. The precipitated hydrochloride is filtered off and recrystallized from ethyl acetate to give N-{1-[γ-(4-fluorobenzoyl)propyl] - 4 - piperidyl}-N-(o-tolyl)cyclopropanecarboxamide hydrochloride melting at about 139.5–144° C.

Example 27

A solution of 6.2 parts of γ,4-dichlorobutyrophenone in 24 parts of 4-methyl-2-pentanone is added portionwise to a stirred mixture of 5 parts of N-(4-piperidyl)acetanilide, 7 parts of sodium carbonate, and 0.1 part of potassium iodide in 136 parts of 4-methyl-2-pentanone. After the addition is complete, the mixture is stirred and refluxed for 40 hours. The hot mixture is filtered and the solvent is evaporated from the filtrate to leave an oily residue which is dissolved in 160 parts of diisopropyl ether and filtered. The filtrate is concentrated to a volume of about 60 parts and cooled. N-{1-[γ-(4-chlorobenzoyl)-propyl] - 4 - piperidyl}acetanilide, melting at about 99.8–101.6° C., crystallizes from the solution.

If the above procedure is repeated and equivalent quantities of the appropriate γ-chlorobutyrophenone is substituted for the γ,4-dichlorobutyrophenone and the appropriate piperidine is substituted for the N-(4-piperidyl)acetanilide, the following compounds are obtained:

N-{1-[γ-(4-chlorobenzoyl)propyl] - 4 - piperidyl}propionanilide melting at about 103.5–104° C.

N-{1-[γ-(4-iodobenzoyl)propyl] - 4 - piperidyl}acetanilide.

N-{1-[γ-(3-chlorobenzoyl)propyl] - 4 - piperidyl}acetanilide.

N-{1-[γ-(4-methylbenzoyl)propyl] - 4 - piperidyl}acetanilide melting at about 78–79.5° C.

N - {1 - [γ - (4 - methylbenzoyl)propyl] - 4 - piperidyl}propionanilide melting at about 81.2–81.6° C.

N-{1-[γ-(4-methoxybenzoyl)propyl] - 4 - piperidyl}acetanilide hydrochloride melting at about 237–239° C. This salt was obtained by passing hydrogen chloride gas through an ether solution of the free amine and recrystalizing the product from 2-propanol.

Example 28

A mixture of 4.8 parts of γ-chloro-4-methoxybutyrophenone, 10.4 parts of N-(4-piperidyl)propionanilide, 0.1 part of potassium iodide, and 80 parts of anhydrous toluene is heated in a sealed tube for 72 hours at 150° C. The cooled reaction mixture is washed twice with 50 parts of water before it is dried over potassium carbonate. Evaporation of the solvent leaves an oily residue which is dissolved in 2-propanol. A hot solution of oxalic acid dihydrate in 2-propanol is added and the resultant mixture is cooled to room temperature. The solid which precipitates is filtered and dried to give N-{1-[γ-(4-methoxybenzoyl)propyl] - 4 - piperidyl}propionanilide melting at about 175–178.5° C.

Example 29

5.5 parts of the hydrochloride of N-(4-piperidyl)benzanilide is dissolved in water and alkalized. The resultant mixture is extracted with toluene and the toluene solution is dried. After evaporation of the solvent of the toluene solution, the residue is stirred and refluxed for 34 hours with 4.4 parts of γ-chloro - 4 - fluorobutyrophenone, 5.5 parts of sodium carbonate and 0.1 part of potassium iodide in 160 parts of 4-methyl-2-pentanone. 50 parts of water is added to the cooled reaction mixture. The aqueous layer is separated and extracted with diisopropyl ether. The combined organic layers are dried over magnesium sulfate and the solvent is evaporated. The residue is dissolved in 240 parts of diisopropyl ether and hydrogen chloride gas is introduced into the solution. The precipitated hydrochloride is filtered off and triturated in boiling ethyl acetate to give N-{1-[γ-(4-fluorobenzoyl)propyl] - 4 - piperidyl}benzanilide hydrochloride melting at about 209–213° C.

*Example 30*

To a stirred mixture of 5 parts of ethyl N-(-piperidyl)-N-phenylcarbamate hydrochloride, 7.5 parts of sodium carbonate and 0.1 part of potassium iodide in 136 parts of 4-methyl-2- pentanone is added portionwise a solution of 4.8 parts of γ-chloro-4-fluorobutyrophenone in 32 parts of 4-methyl-2-pentanone. The resultant mixture is stirred and refluxed for 65 hours. The reaction mixture is cooled, 100 parts of water is added and the organic layer is separated and dried over magnesium sulfate. The solvent is evaporated from the organic layer to give an oily residue which is dissolved in 32 parts of diisopropyl ether and cooled. Ethyl N-{1[γ-(4-fluorobenzoyl)propoyl]-4-piperidyl}-N-phenylcarbamate, melting at about 92.8–94.2° C. with decomposition, crystallizes from the solution. This product has the following formula

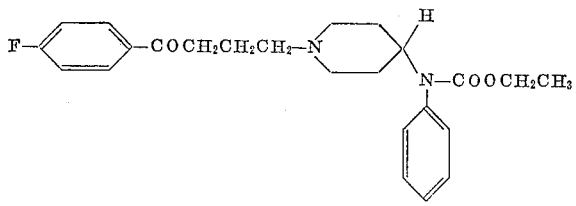

If 5 parts of methyl N-(4-piperidyl)-N-phenylcarbamate hydrochloride are substituted for the ethyl N-(4-piperidyl)-N-phenylcarbamate hydrochloride and the above procedure is repeated, the product is methyl N-{1-[γ - (4-fluorobenzoyl)propyl] - 4 - piperidyl}-N-phenylcarbamate.

*Example 31*

A mixture of 7.6 parts of γ-chloro-4-fluorobutyrophenone, 5.5 parts of N-(4-piperidyl)-N-phenyl-N',N'-pentamethyleneurea, 10 parts of sodium carbonate and 0.1 part of potassium iodide in 160 parts of 4-methyl-2-pentanone is stirred and refluxed for 36 hours. 200 parts of water is added to the cooled mixture. The organic layer is separated, dried over potassium carbonate and filtered, and the solvent is evaporated from the filterate. The residue is recrystallized from diisopropyl ether to give N - {1-[γ-(-fluorobenzoyl)-propyl]-4-piperidyl}-N-phenyl-N',N'-pentamethyleneurea, melting at about 95–98° C.

If equivalent quantities of the appropriate substituted urea are substituted for the N-(4-piperidyl)-N-phenyl-N',N'-pentamethyleneurea and the above procedure is repeated, the following compounds are obtained:

N - {1-[γ - (4 - fluorobenzoyl)propyl]-4-piperidyl}-N-phenyl - N',N'-(3-oxapentamethylene)urea, melting at about 103.2–108.2° C. with decomposition.

N - {1-[γ - (4 - fluorobenzoyl)propyl]-4-piperidyl}-N-phenyl-N',N'-dimethylurea, metlting at about 82–83.5° C.

N - {1-[γ - (4 - fluorobenzoyl)propyl]-4-piperidyl}-N-phenyl-N',N'-tetramethyleneurea, melting at about 167–168° C.

N - {1-[γ - (4 - fluorobenzoyl)propyl]-4-piperidyl}-N-(o-tolyl)-N',N'-pentamethyleneurea, melting at about 99–99.8° C. This compound has the following formula

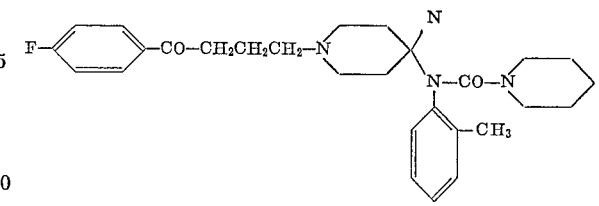

What is claimed is:
1. A compound of the formula

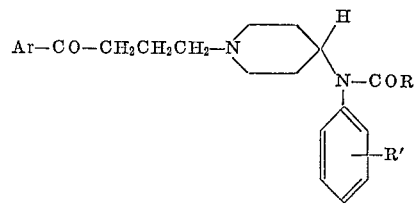

wherein Ar is selected from the group consisting of phenyl, halophenyl, tolyl, methoxyphenyl, and thienyl; R is selected from the group consisting of lower alkyl, lower alkoxy, phenyl, cyclopropyl, dimethylamino, morpholino, 1-piperidinyl, and 1-pyrrolidinyl; and R' is selected from the group consisting of hydrogen, methyl and methoxy.

2. A compound of the formula

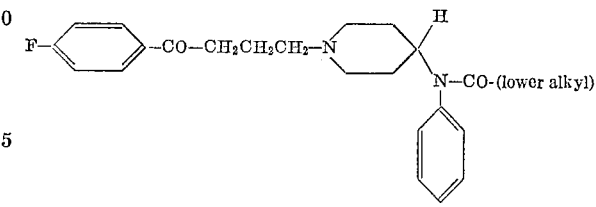

3. N - {1 - [γ-(4 - fluorobenzoyl)propyl]-4-piperidyl}-propionanilide.

4. A compound of the formula

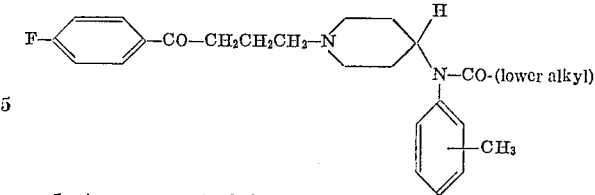

5. A compound of the formula

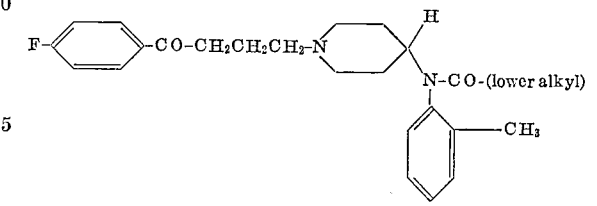

6. N - {1 - [γ - (4 - fluorobenzoyl)propyl] - 4 - piperidyl}-o-propionotoluidide.

7. N - {1 - [γ - (4 - fluorobenzoyl)propyl] - 4 - piperidyl}-o-acetotoluidide.

8. A compound of the formula

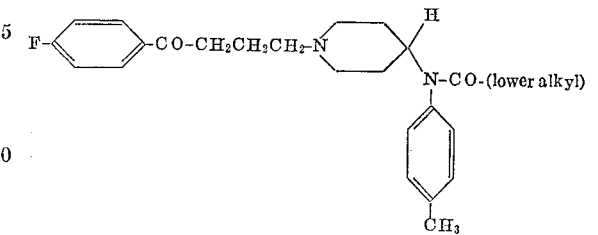

9. N - {1 - [γ - (4 - fluorobenzoyl)propyl] - 4 - piperidyl}-p-propionotoluidide.

10. A compound of the formula
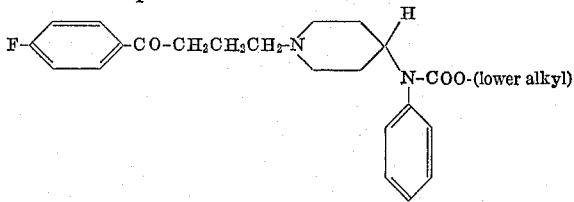
11. Ethyl N-{1-[γ-(4-fluorobenzoyl)propyl]-4-piperidyl}-N-phenylcarbamate.
12. N-{1-[γ-(4-fluorobenzoyl)propyl]-4-piperidyl}-N-phenyl-N',N'-(3-oxapentamethylene)urea.
References Cited in the file of this patent
UNITED STATES PATENTS
| | | |
|---|---|---|
| 2,824,875 | Elpern | Feb. 25, 1958 |
| 2,914,532 | Elpern | Nov. 24, 1959 |
| 2,962,501 | Cutler et al. | Nov. 29, 1960 |
| 3,004,977 | Janssen | Oct. 17, 1961 |
| 3,012,030 | Janssen | Dec. 5, 1961 |
OTHER REFERENCES
Nazarov et al.: "Chemical Abstracts," vol. 54, page 8812 (1960).